United States Patent [19]

Hensel et al.

[11] 4,318,894

[45] Mar. 9, 1982

[54] APPARATUS FOR THE CATALYTIC PURIFICATION OF EXHAUST GASES

[75] Inventors: Jörg Hensel, Hanau; Edgar Koberstein, Alzenau; Alfred Bozon, Erlensee; Martin H. Völker, Hanau, all of Fed. Rep. of Germany

[73] Assignee: Deutsche Gold- und Silber-Scheideanstalt vormals Roessler, Frankfurt am Main, Fed. Rep. of Germany

[21] Appl. No.: 220,569

[22] Filed: Dec. 29, 1980

Related U.S. Application Data

[63] Continuation of Ser. No. 63,329, Aug. 2, 1979, abandoned, which is a continuation of Ser. No. 596,220, Dec. 12, 1977, abandoned.

[30] Foreign Application Priority Data

Dec. 24, 1976 [DE] Fed. Rep. of Germany ....... 2658892

[51] Int. Cl.³ .......................... B01D 53/36; F01N 3/28
[52] U.S. Cl. ................................ 423/212; 423/213.2; 252/477 R; 422/176; 422/177; 422/220

[58] Field of Search ................. 423/212, 213.2, 213.7; 252/477; 422/176, 177, 220; 60/299, 302

[56] References Cited

U.S. PATENT DOCUMENTS

| | | | |
|---|---|---|---|
| 2,664,340 | 12/1953 | Houdry | 423/213.5 |
| 2,679,724 | 6/1959 | Pomykala | 423/212 X |
| 3,554,929 | 1/1971 | Aarons | 423/213.5 X |
| 3,716,344 | 2/1973 | Ashburn | 423/213.2 |
| 3,917,811 | 11/1975 | Grout et al. | 423/659 X |
| 3,996,443 | 6/1976 | Okano et al. | 422/177 X |

FOREIGN PATENT DOCUMENTS

| | | | |
|---|---|---|---|
| 730675 | 3/1966 | Canada | 423/213.2 |
| 354692 | 2/1930 | United Kingdom | 423/213.2 |

*Primary Examiner*—G. O. Peters
*Attorney, Agent, or Firm*—Beveridge, DeGrandi & Kline

[57] ABSTRACT

Baffle means coated with effective catalyts are positioned inside exhaust pipes to convert the harmful substances in said exhaust gases into harmless components. The baffle means impart a disturbed flow and/or change of the direction of flow of the exhaust gases in the exhaust pipe.

13 Claims, 3 Drawing Figures

APPARATUS FOR THE CATALYTIC PURIFICATION OF EXHAUST GASES

This application is a continuation of copending application Ser. No. 063,329 filed Aug. 2, 1979, now abandoned which in turn is a continuation of copending application Ser. No. 859,622 filed Dec. 12, 1977, now abandoned, both of which applications are relied on herein.

The harmful substances contained in exhaust gases, especially in exhaust gases produced by the internal combustion engines of motor vehicles, represent a danger to human health. The content of such harmful or noxious substances in auto emissions is now severely curtailed in some countries by laws which establish maximum concentrations of the harmful substances in the exhaust gases. The limiting values are very low in the United States and therefore the overwhelming preponderance of the new vehicles sold in the United States are equipped with catalytic means for purification of these gases.

The invention deals with the creation of an uncomplex apparatus by which means the noxious substances contained in the exhaust gases of internal combustion engines may be largely converted into harmless components.

BACKGROUND OF THE INVENTION

It has been known for some time that the purification of exhaust gases may be carried out by using catalysts which are deposited on ceramic carrier materials of various sorts. The use of ceramic carriers has the disadvantage, however, that many of them are sensitive to mechanical stresses and must be built into the exhaust system of the vehicle by means of an additional specially designed support or housing device which is separate and distinct from the exhaust pipe itself.

The carrier catalysts and their housings require, as does any thermoreactor, additional space near the engine for their attachment in order for proper functioning. Since frequently there is very little free space under the hood of a car or under the chassis of the vehicle, any arrangement which decreases the space required for the catalyst reactor housing represents an advantage.

Catalysts have also been described in the prior art which employ a metal carrier for the catalytically active substance. Thus, the German No. OS 22 51 631 describes a process for the purification of exhaust gases employing a catalyst deposited on a metallic carrier made of an electrically conductive material.

According to German No. OS 23 51 237 and German No. AS 23 04 351, a catalytically active material is deposited onto a metal carrier, which may be formed into a shape similar to a ceramic monolithic carrier. For these carriers as well as for the metal carrier shown in German No. OS 24 50 664, a large geometric surface is required.

In the German No. OS 23 13 040 the requirement of little loss of pressure as a result of the catalyst is pointed out. The catalyst described therein, however, requires considerable quantities of costly high temperature and corrosion resistant metal.

In the catalyst according to the German No. OS 24 53 538, the carrier itself is catalytically active, similar to the case of the known Gould catalyst which consists of a nickel/copper alloy, for the reduction of nitrogen oxides. One disadvantage, however, of this type of catalyst and also as described in German No. AS 21 64 123 is the small specific surface, which offers no ideal conditions for the catalytic reaction of the gas molecules on the active metal.

Generally, the catalysts known up to the present time are expensive and require special containers or housings and as a result take up considerable volume and space.

SUMMARY OF THE INVENTION

It is an object of the invention to provide an apparatus for the catalytic purification of exhaust gases, especially those gases emitted by internal combustion engines of motor vehicles. The apparatus structure is characterized by a metal exhaust pipe, or pipe system, provided with means positioned in that pipe, which impart a flow disturbing and/or flow direction changing motion to exhaust gases when passing through that pipe. The pipe or pipe system structure of the invention produces a dynamic pressure increase of 0.3 to 2500 mm water, measured at a flow velocity of air at room temperature of 12 m/sec., as compared to a pipe or pipe system not equipped in a manner so as to cause a flow disturbing and/or flow direction changing pattern. The exhaust pipe apparatus of this invention is at least partially coated with a catalytic mass and the means to disturb or interrupt the flow, are entirely or partially coated with a catalytic mass. The catalyst mass or composition is active in respect of converting the undesirable and unwanted substances in the exhaust stream into harmless or less noxious components.

Basically, the invention features the utilization of the exhaust pipe system, present in all vehicles or at least a section of it, to perform an additional function; that is, the exhaust pipe or manifold closest to the engine is equipped to act as a catalytic converter. For this purpose, the apparatus of the invention is mounted between the exhaust outlet of the engine and for example, the muffler, as a result of which the hot combustion exhaust gases emerging directly from the engine provide for a short warm up time for the catalyst. The essential characteristics of the apparatus are its baffles or other flow impeding means which function to impart a highly turbulent flow pattern to the gases; and the coating of these means with catalytically active deposits and layers. As a result of this invention, the need for a special cannister or housing for the catalyst is eliminated.

The invention may be further understood by reference to the drawings, wherein.

Figure 1A:
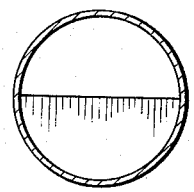
FIG. 1 is a cross-sectional view of an exhaust pipe fitted with various baffle means.

The high temperature resistant and corrosion insensitive converter pipe creates a disturbed flow of exhaust gas and/or reinforces the existing disturbance by a pattern of deflection and divergence. Surprisingly, it was found that even a relatively slight disturbance of the flow resulting in a small rise of the dynamic pressure brings about an unexpectedly high conversion improvement. This disturbance in the flow of the exhaust gases may be achieved by baffles built into or suitably disposed at intervals within the metal exhaust pipe.

The metal exhaust pipe may be formed in a variety of ways. For example, its cross sectional area may correspond to that of the exhaust pipe; that is, it need not be any larger in size. Preferably, a circular form or an oval cross section should be selected. In the designing of the dimensions of a suitable metal pipe of the invention, consideration must be taken of the fact that too small a cross section of the pipe will create great resistance to the flow of gases at very high flow rates and will result in undesirably high flow resistances to the exhaust gas. Too large a cross sectional area of the pipe is a disadvantage because it means that the space requirements will be great. The metal pipe may be disposed directly next in line after the exhaust valve of the engine; i.e. in the exhaust manifold, in order to make use of the high exhaust temperature prevailing at that location and to thereby enhance effective catalytic conversion of the harmful substances into harmless products.

The essential advantage of the exhaust gas purification apparatus of the invention, as compared to exhaust gas converters which operate with bulk material or with monolithic catalysts, resides in the fact that the dimensions of customary exhaust pipes in motor vehicles may be essentially maintained without the need of specially designed cannisters or catalyst housings.

The metal pipe has in most cases an opening which corresponds to a circular cross sectional surface of a diameter of 8 to 250 mm, whereby the length of the pipe may amount to between 80 and 3500 mm. In some cases, it may be advantageous to replace the entire exhaust pipe by an apparatus of the same length according to the invention.

The exhaust pipe may be made of a variety of materials to resist the chemical and thermal loads; i.e. corrosion resistant and high temperature resistant metal, such as for example, Termax, Kanthal, nickel-alloyed steels and the like. The total material requirement in this case is considerably lower than in the case of the known devices for exhaust gas purification.

Various means may be employed to produce a configuration in the metal pipe that will achieve the desired turbulent flow. One such means is by bending the axis of the pipe. However, the required flow resistance may also be achieved by a rough, fissured surface inside the pipe or an internal structure with projecting sharp edges on the inside wall of the pipe. Thus it may be sufficient, for example, to provide internal grooves or ridges at selected distances or locations in a cyclindrical metal pipe in order to provide the internal wall with projecting edges that will induce a turbulent flow in the gases passing therethrough. Furthermore, as an alternative embodiment, the metal pipe may be provided only in the area of the entry of the gas with an inserted unit in the form of single or double coiled, twisted body as a result of which the flow of exhaust gas is given an additional rotary movement around its own axis as it passes through the pipe.

According to the invention the metal pipe is equipped with disturbed flow imparting structures such as deflecting surfaces or baffles. These structures may consist of plates, perforated plates, metal netting or ceramic, and are shaped and disposed in such a way that the increase in dynamic pressure as specified above will be maintained. Preferably, the apparatus is arranged so that it produces an increase in the dynamic pressure of 1.0 to 500 mm water in a water column at 12 m/sec. air velocity at room temperature, as compared to a pipe with a smooth wall. Flat or spherically bent, turbulent flow imparting devices may be disposed in a manner of a labyrinth in order to satisfy these conditions.

The turbulent flow imparting baffle may be attached solidly or releasably on the inside surface of the metal pipe. In an advantageous variation of the type of mounting, the inserts are attached on ribbons disposed in the metal pipe which ribbons are mounted releasably at one or several places inside the pipe. Naturally, baffles of different types may be used in one and the same apparatus in order to produce the desired flow pattern.

The apparatus of the invention may be further modified in such a manner that the disturbed flow inducing and/or flow direction changing projections or baffles are provided only in the entry area of the metal pipe or the metal pipe system. In this case, the rear section of the metal pipe is free of any baffles or projections.

According to a preferred variation however, provisions may also be made for an apparatus wherein the first section of the metal pipe or of the system of metal pipes is free of catalyst, but does contain the disturbed flow inducing and/or flow direction changing baffles. A second section of the metal exhaust pipe, in the direction of the flow of exhaust gas, contains interior baffles or projections coated with a catalyst. The rear section of the exhaust pipe which is coated entirely or partly with a catalyst mass may be, but does not have to be, structured to result in a flow disturbing pattern or in a pattern changing the direction of flow of the exhaust gases.

Finally, it is within the scope of the invention that the exhaust manifold of the automotive engine or the muffler of the motor vehicle is built to contain baffles or projections which function to produce a disturbed flow pattern and/or changing the direction of flow.

Since, in most cases, the projections or baffles are exposed to higher thermal stresses than the metal pipe, the baffle must be fabricated of suitable material capable of withstanding these stresses. Highly temperature resistant metals or ceramics, such as sintered corundum, silicon carbide or reaction sintered silicon nitride may be used. The pipe and the inserts are not required to be formed on the same identical material. The catalyst mass may be applied to the inside surfaces of the metal pipe or to the baffle inserts, or to both. Any catalyst composition known in the art for treatment of exhaust gas may be used for purposes of this invention.

The catalyst mass may contain at least one non-noble metal oxide with a specific surface larger than 1 $m^2/g$. Examples of non-noble metal oxides are the oxides of the elements of Group II to IV of the main groups of the Periodic Table System as well as oxides from sub-group elements with a melting point of about 1000° C. Mixed oxides may also be used.

Illustratively, gamma-aluminum oxide, zirconium oxide, titanium dioxide, magnesium oxide, silicon dioxide, zinc oxide, chromium oxide, nickel oxide, manganese oxide, copper chromium oxide, oxides of the rare earth such as cerium oxide, as well as combinations of these oxides may be used. These non-noble metal oxides or mixed oxides, however, may also be applied as a coating on a catalytically inactive ceramic coating which coating adheres to the metal surface of the exhaust pipe. Examples for such inert coatings are α-aluminum oxide, mullite or cordierite.

As catalytically active components, non-noble metal or noble metal containing catalyst systems are used. These are deposited either as a coating on the inert ceramic or onto a combination of a ceramic support and a base metal oxide coating. It should be understood that noble metals such as the platinum group metals may be used either singly or in mixtures. Specifically, platinum, palladium, rhodium, iridium and ruthenium and especially platinum, palladium and rhodium are contemplated in this regard. The noble metals may be used in amounts of between 20 to 5000 mg/l of volume of metal pipe.

In carrying out the present invention various forms may be prepared:

1. The catalyst composition may be deposited directly onto the metal pipe interior surface by applying it from a liquid, especially in an aqueous form, or from the gaseous phase.

2. As an alternative, it is also possible to first deposit a layer of a material with a high specific surface area to the metal pipe. Subsequently the pipe may be coated or impregnated with the catalytically active mass. The steps in this process may be carried out in various ways. For example, one material with a high specific surface area may be deposited from a salt solution or form a dispersion. The layer may also be formed by chemical precipitation on the pipe or, for example, by flame spraying. In the latter case, the material may be applied directly in the form used later; e.g. as an oxide, or in its elementary form from which it subsequently may be converted by secondary treatment into its final form. This secondary treatment may be an oxidation with oxygen or with liquids containing oxidizing agents. Any other convenient secondary treatment may be used. The active catalyst components may then be applied to the first layer thus formed by any convenient methods as is known in the art.

3. In the case of some aspects of the invention, it would be advisable to first apply a firmly adhering layer of an inert material such as $\alpha$-$Al_2O_3$, cordierite, mullite or similar substances onto the interior surface of metal pipe. The catalyst may then be applied directly to this or after the coating with the above described intermediate layer directly to this layer. Moreover, it is possible to apply the material of the intermediate layer jointly in one step with the catalyst material.

As has already been mentioned above, generally two methods may be used in order to deposit the material on the inside wall of the pipe. The material may be adhesively applied in a gaseous phase by steaming or vapor deposition, or from the liquid phase by precipitation. The latter method includes working with molten material; e.g. flame spraying, submerging into the melt, as well as working with solutions, dispersions, or suspensions, which contain water, inorganic or organic solvents as their liquid medium.

In most cases, a pre-treatment of the exhaust pipe for the purpose of cleaning and/or roughening the interior metal surface thereof is accomplished independently of the method of coating. Various methods may be used for this purpose including brushing, sand blasting or grinding of the interior pipe surfaces. The baffles and projections may also be prepared by these means. In those cases where only the baffles and projections are intended to be coated with the catalyst component, the baffles are surface treated to prepare them and subsequently coated prior to their insertion into the converter pipe.

The deposition of the catalytic component from a liquid medium may be carried out by using a solution, a dispersion or a suspension of the catalyst material according to the methods known in the art. Single or multiple steps may be employed as is known in the art. It is also possible to form a coating by employing a melt and by flame spraying, or by immersion of the parts that are to be coated in a molten catalyst material.

Catalyst masses where the catalytically active metal oxides or metals are applied to an intermediate layer comprising an alkaline earth metal and/or earth metal and/or rare earth oxide have proven themselves as particularly effective and durable resistant. Especially useful in this respect are aluminum and/or titanium and/or zirconium oxides. As has been mentioned, the intermediate layer in that case may also be applied to a ceramic lining formed in the metal pipe.

The conversion effects which may be achieved with the apparatus of the invention are unexpectedly high despite the simple construction. Thus, 80% of the hydrocarbon substances and 60% of the carbon monoxide was converted from the exhaust gas of an Otto motor with a metal pipe equipped with baffles (baffles and pipe coated with catalyst mass) which metal pipe had only one tenth of the geometric surface of the customary ceramic monolith catalyst coated with the same catalyst mass. In comparison to that, in the case of the monolith catalyst 80% of the hydrocarbons and 95% of the carbon monoxide were converted.

The present invention includes as one of its aspects the use of the herein described apparatus for purifying the exhaust gases of internal combustion engines, especially for the oxidation of hydrocarbons and carbon monoxide as well as the reduction of nitric oxides which are contained as harmful substances in the exhaust gases of Otto, Diesel and Wankel engines.

The invention will be further explained in connection with the accompanying drawings wherein FIG. 1 is a sectional view showing various embodiments of the exhaust pipe structure of the invention with the round cross section of the pipe in the direction of the axis of the pipe. It should be noted that the pipe structure of the invention may be oval, elliptic, rectangular, square or irregular in cross section and that the FIGS. 1 and 2 should be so interpreted.

FIGS. 1A, D, E, F, G, H and I show plates of various metal forms which narrow down and constrict the free cross section of the pipe. The remaining free cross section may be varied according to the intended use requirements by enlarging or decreasing the forms shown in the figures.

Figure 1B:
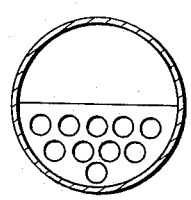
Figure 1C:
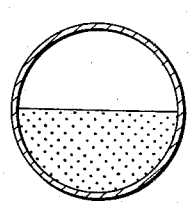
Figure 1D:
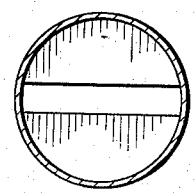
Figure 1E:
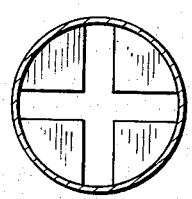
Figure 1F:
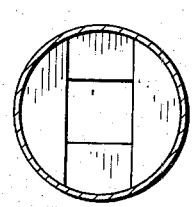
Figure 1G:
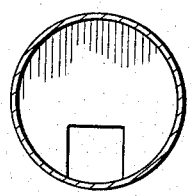
Figure 1H:
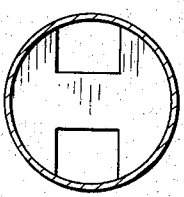
Figure 1I:
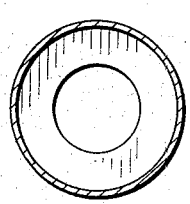
Figure 1J:
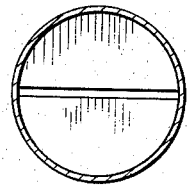

The restriction in cross sectional open space, as shown in these figures, also may be accomplished with a plate or a perforated plate as shown in FIG. 1B or as shown in FIG. 1C with a wire mesh. Likewise, a metal band (FIG. 1J) which is turned in a screwlike manner (FIG. 2D) or is provided with turbulence producing additional surfaces (2C), may alo be employed. It is also possible that the baffle be turned and twisted and provided with additional surfaces.

FIG. 2 is a sectional view taken along the axis of the pipe and shows the relative positions of representative baffle structures.

Figure 2A:
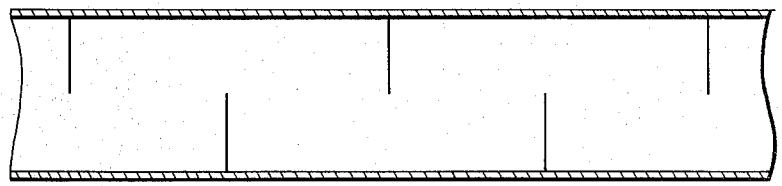
FIG. 2 is a sectional view of an exhaust pipe showing the dispositions of various baffle means.
Figure 2B:
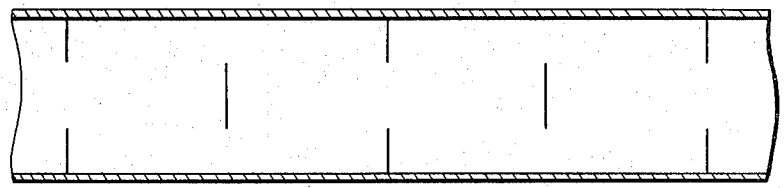
Figure 2C:
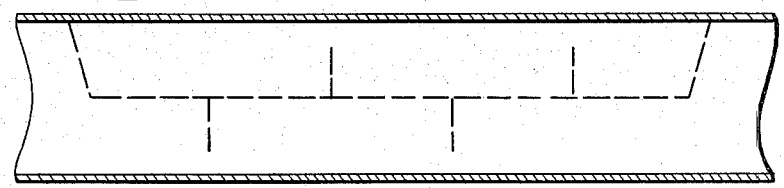
Figure 2D:
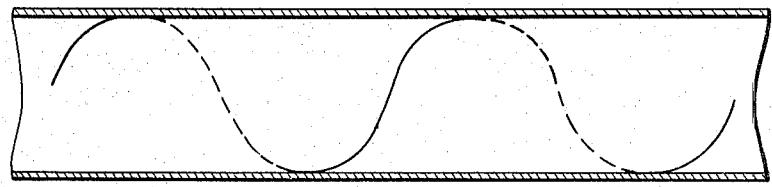
Figure 3A:
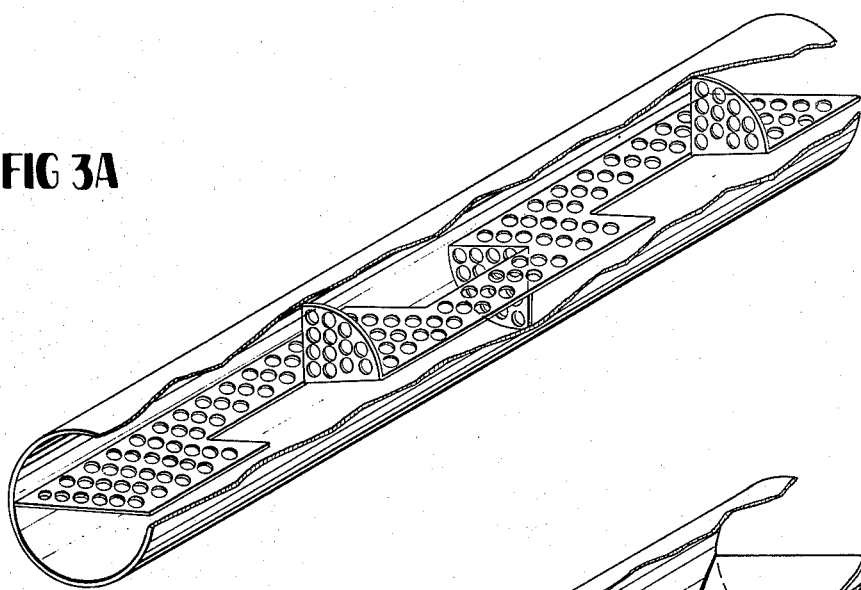
FIG. 3 is a perspective view showing various types of baffle configurations.
Figure 3B:
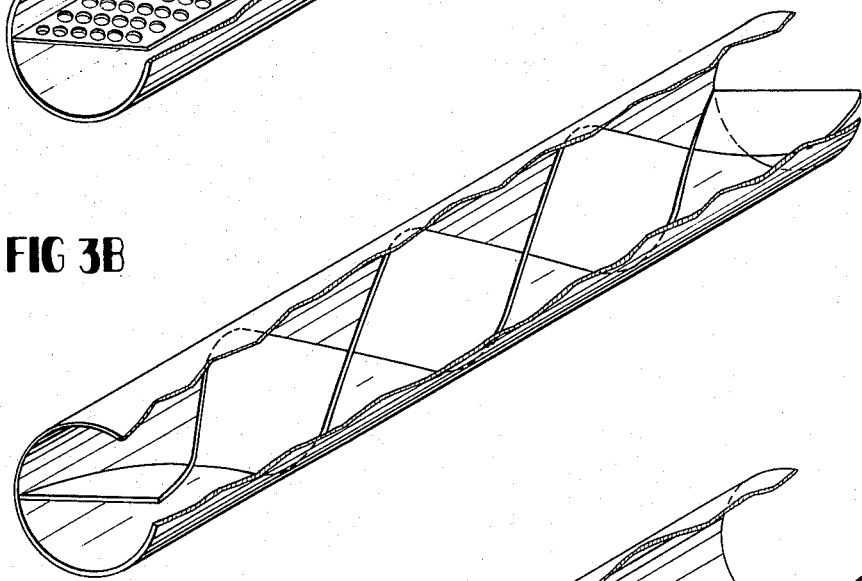
Figure 3C:
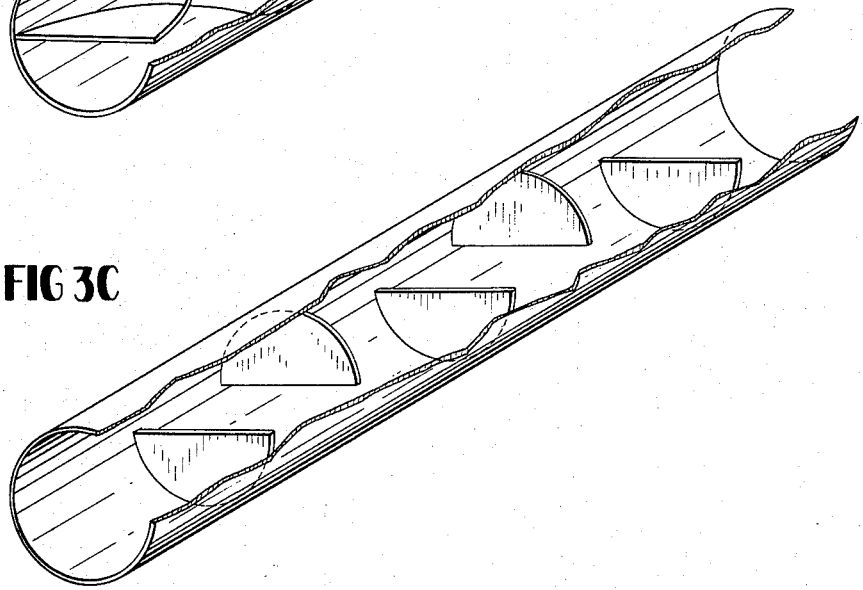

On the other hand, the turbulence inducing means may also be fixed in the pipe in an alternating arrangement as shown in FIGS. 2A and B. FIG. 3 shows the embodiments of FIGS. 2C, 2D, and 2A in perspective view.

DETAILS OF THE INVENTION

The following examples illustrate the invention without restricting it in any respect.

Example 1

A pipe of 110 cm length, with an inside diameter of 45 mm and a wall thickness of 1.5 mm was equipped with 10 baffles of the type shown in FIGS. 1A and 2A, whereby the baffles always cover up 40% of the circular cross-sectional surface area and were turned in an alternating manner, 180° around the axis of the pipe, and were inserted at spaced intervals of about 10 cm. The flow resistance at 12 meters/second of air velocity and room temperature amounted to 400 mm of water in a water column as compared to a corresponding pipe with a smooth inside wall. This pipe was cleaned of any rough impurities by a light sand blasting, and was provided with a thin layer of $\gamma$—$Al_2O_3$ by flame spraying. The layer thus formed was reinforced by a subsequently applied layer of $\gamma$—$Al_2O_3$ (specific surface of the solid substance 130 m/g) from an aqueous dispersion. This layer was saturated with an aqueous solution which contained 1 g. of noble metal in a ratio of 8.5 parts of platinum for 1 part of rhodium.

Example 2

The pipe described in example 1 was used in a test run wherein an exhaust gas from a motor was passed through at a rate of 110 m³ of exhaust gas per hour. The exhaust gas had a composition of 0.5% CO, 0.02% $NO_x$, 0.0015% hydrocarbons, 1.2% $O_2$ as well as 13.8% $CO_2$, approximately 10% $H_2O$ and a residue of nitrogen. At 700° C., a conversion of 64% hydrocarbons and 35.3% CO resulted.

Example 3 (Comparative example)

An identical pipe as described in example 1 is used for purposes of this comparative example, but without any baffles. The baffle-less pipe is cleaned, coated with catalyst in exactly the same manner as in example 1. This pipe was then tested under the conditions described in example 2. In this case using the pipe free of any baffles, a very low conversion of 16.7% hydrocarbons and 20.0% CO was obtained.

Example 4

A pipe with an inside diameter of 40 mm and a length of 950 mm made of a heat resistant steel alloy Thermax is coated on the inside wall thereof with 1 g. of platinum and 1 g. of $Al_2O_3$ (specific surface 150 m²/g.) by precipitation with ammonia. Four perforated plates with bores of 2 mm (remaining surface 80%) are inserted at regular intervals of 200 mm, according to FIGS. 1A, and 2B. A resulting increase in the flow resistance of 3 mm as measured in a water column at an air velocity of 12 meters/second as compared to the free pipe was determined.

Example 5 (Comparative example)

A pipe as in example 4 is identically produced but without the insertion of the four perforated plates.

Example 6

A pipe according to example 4 is produced in the identical manner except that the four perforated plates reach farther into the inside space of the pipe. As a result in comparison to the pipe of example 5 an increase in flow resistance, viz of 110 mm of water in a water column, at the same air velocity of 12 meters/second is obtained.

Example 7

The pipes produced according to examples 4 to 6 are tested in a synthetic gas-test apparatus. In carrying out the test, 24,000 liters of air/hour are preheated to the measuring temperature, 0.5 volume percent of CO and 200 ppm of propene are admixed and the conversion is determined at intervals of 10° C. The following values resulted for the temperature of achieving 50% CO conversion:

Pipe of example 4: 410° C.
Pipe of example 5: 550° C.
Pipe of example 6: 350° C.

This example shows that very small increases in resistance as compared to a free pipe is required for the temperature of 50% CO conversion to be reduced by 140° C. and thus to achieve a considerably improved conversion.

Further variations and modifications of the invention will be apparent to those skilled in the art.

We claim:

1. An apparatus for the catalytic purification of exhaust gases from combustion engines of motor vehicles comprising a customary metal automobile exhaust pipe the dimensions of which do not vary along the length thereof, and which does not contain any special housings or cannisters for catalysts, the interior of said exhaust pipe being at least partially coated with a catalytically active metal oxide or metal, the catalytic material being deposited upon an intermediate layer selected from the group consisting of alumina, zirconium oxide, titanium oxide, magnesium oxide, copper chromium oxide, rare earth metal oxides and mixtures thereof, said exhaust pipe being further provided with a high temperature resistant means in the form of flow interrupting baffle surfaces which are secured to metal ribbons mounted at one or several points inside the pipe, said baffle surfaces reducing the free cross-sectional area of the exhaust pipe to such an extent that the dynamic pressure inside the pipe is increased by 1 to 500 mm of water measured at a flow velocity in air at room temperature of 12 meters per second whereby the temperature for achieving 50% CO conversion is lowered, as compared to a pipe with a smooth wall, said pipe being mounted between the exhaust outlet of the engine and the muffler and representing the sole means to convert the exhaust gases to harmless constituents.

2. The apparatus as defined in claim 1 wherein the metal pipe has an opening, the cross-section of which corresponds to a circular cross-sectional surface area with a diameter of 8 to 250 mm and a length of 80 to 3500 mm.

3. An apparatus as defined in claim 1 wherein the metal pipe consists of corrosion resistant or temperature resistant metal.

4. An apparatus as defined in claim 1 wherein the ribbon strips are releasably attached in said pipes.

5. The apparatus as defined in claim 1 wherein the catalytic material has a specific surface area larger than 1 m²/g.

6. An apparatus as defined in claim 1 wherein oxides of the elements of the second to the fourth main group of the periodic system as well as oxides of the sub group elements with a melting point above 1,000° C. are used in the catalyst composition.

7. An apparatus as defined in claim 6 wherein the platinum metals are used in the catalyst.

8. An apparatus as defined in claim 7 wherein the platinum group metals are used in the quantity of 20 to 500 mg/l volume of metal pipe.

9. An apparatus as defined in claim 1 wherein the first section of the pipe nearest the engine contains the flow disturbing baffles and is free of catalysts and in a second subsequent section of the metal exhaust pipe in the direction of the flow of exhaust gases, the baffles are coated with the catalyst.

10. The apparatus as defined in claim 1 wherein the rearward section of the exhaust pipe in the direction of the flow of the exhaust pipe is coated entirely with a catalyst.

11. An apparatus as defined in claim 1 wherein the intermediate layer is deposited on the pipe by means of a dispersion and thereafter the catalytic material is applied to the intermediate coating by means of a liquid composition.

12. The apparatus of claim 1 wherein the intermediate layer of catalytically active metal is applied in two steps, first by flame spraying and a second coat by aqueous dispersion, whereupon the catalytic metal material is subsequently deposited on said intermediate layer.

13. A process for the catalytic purification of exhaust gases from the combustion of engines of motor vehicles, comprising passing the exhaust gases from a motor vehicle through at least one customary metal exhaust pipe without the need of specially designed cannisters or catalyst housings, said pipe being provided with a high temperature resistant means in the form of baffle surfaces which are secured to metal ribbons mounted at one or several points inside the pipe, said baffle surfaces reducing the free cross-section of the exhaust pipe to such an extent that the dynamic pressure inside that pipe is increased by 1 to 500 mm of water, measured at a flow velocity of air at room temperature of 12 meters per second and thereby lowers the temperature for achieving 50% CO conversion as compared to a pipe with a smooth wall:

at least a portion of the interior surfaces of said pipe being coated with a catalyst component, said pipe being mounted between the exhaust outlet of the engine and the muffler wherein the exhaust gases are subjected to catalytic action to convert the hydrocarbons and carbon monoxide content of said exhaust gas into $H_2O$ and/or reducing nitrogen oxide to nitrogen, the catalytic material being deposited on an intermediate layer selected from the group consisting of alumina, zirconium oxide, titanium oxide, magnesium oxide, copper chromium oxide, rare earth metal oxides and mixtures thereof.

* * * * *